UNITED STATES PATENT OFFICE.

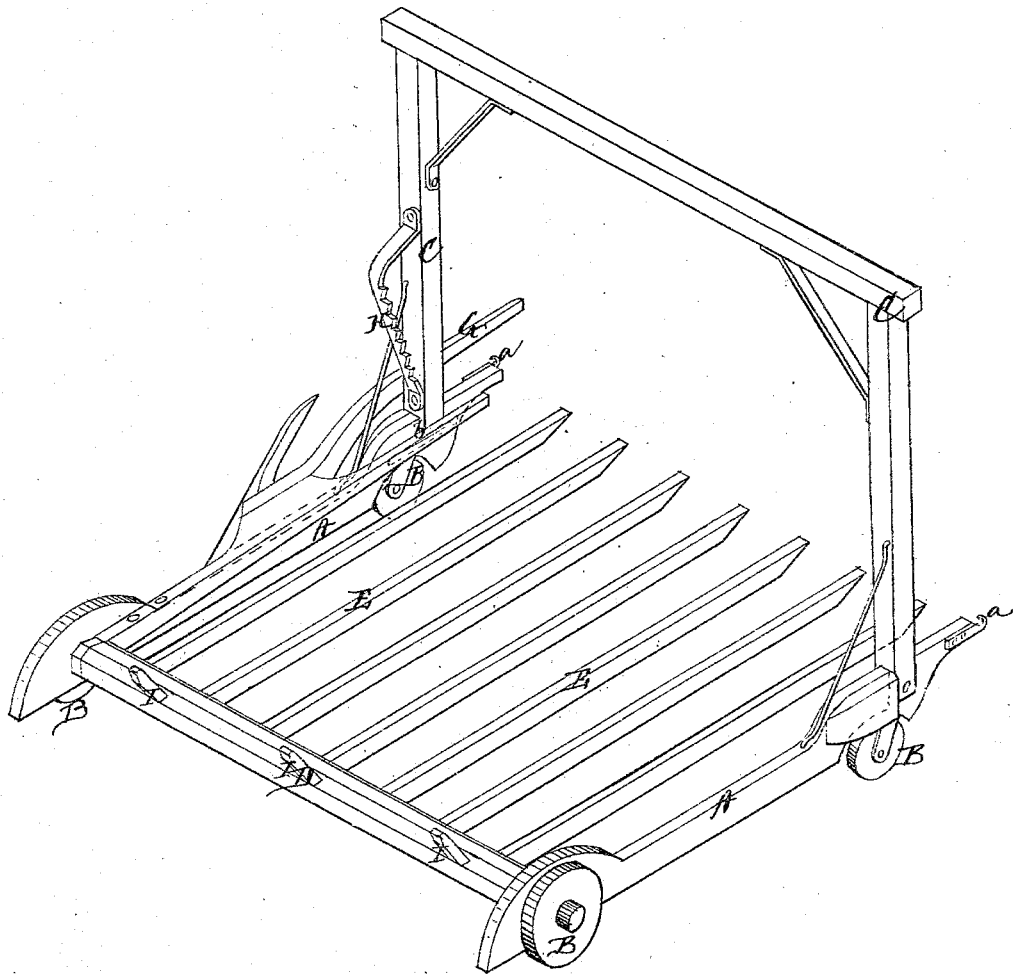

ALEXANDER STREAN, OF HARRODSBURG, INDIANA.

IMPROVEMENT IN HAY-GATHERERS.

Specification forming part of Letters Patent No. 115,783, dated June 6, 1871.

*To all whom it may concern:*

Be it known that I, ALEXANDER STREAN, of Harrodsburg, in the county of Monroe and State of Indiana, have invented certain new and useful Improvements in Gathering and Hauling Hay; and I do hereby declare that the following is a full, clear, and exact description thereof, reference being had to the accompanying drawing and to the letters of reference marked thereon which form a part of this specification.

The nature of my invention consists in the construction and arrangement of a hay gatherer and hauler, as will be hereinafter more fully set forth.

In order to enable others skilled in the art to which my invention appertains to make and use the same, I will now proceed to describe its construction and operation, referring to the annexed drawing, which represents a perspective view of my machine.

A A represent two side pieces, mounted upon rollers or small wheels B B, one at each end of each side piece, and connected near their front ends by means of an upright frame, C. To the front ends of these side beams are attached hooks *a a*, for the purpose of hitching the team to. In the rear ends of the side beams A A the shaft or axle D has its bearings, thus connecting the side beams at this end of the machine. To the shaft or axle D are attached the teeth E E, pointing forward between the side beams, as shown. When the machine has gathered a load of hay the teeth are hoisted to any desired height by means of a lever, G, connected to one end of the shaft D, until a catch, *b*, upon one of the teeth engages with a toothed bar, H, upon the frame C, thus holding the load up while transporting it to the desired place.

By this machine hay may be taken up from the mower or from the windrow and hauled to any part of the meadow, thus doing away with the expense of shocking. This machine can also be used for hauling shocks by removing a part of the teeth. On the upper side of the axle or shaft D are pins I I, which prevent the hay from falling over the axle behind.

Having thus fully described my invention, what I claim as new, and desire to secure by Letters Patent, is—

The combination of the side beams A A, wheels B B, frame C, shaft D, teeth E E, pins I I, lever G, catch *b*, and toothed bar H, all constructed and arranged substantially as and for the purposes herein set forth.

In testimony that I claim the foregoing as my own I affix my signature in presence of two witnesses.

ALEXANDER STREAN.

Witnesses:
R. W. CARR,
C. R. STEPHENSON.